United States Patent
M M et al.

(10) Patent No.: US 11,412,442 B2
(45) Date of Patent: Aug. 9, 2022

(54) PREDICTIVE SERVICE ADVERTISEMENTS BY SERVICE DISCOVERY GATEWAY

(71) Applicant: Cisco Technology, Inc., San Jose, CA (US)

(72) Inventors: Niranjan M M, Bengaluru (IN); Nagaraj Kenchaiah, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/902,033

(22) Filed: Jun. 15, 2020

(65) Prior Publication Data
US 2021/0345231 A1 Nov. 4, 2021

(30) Foreign Application Priority Data
Apr. 30, 2020 (IN) .............................. 202041018523

(51) Int. Cl.
*H04W 4/00* (2018.01)
*G06F 15/173* (2006.01)
*H04H 20/71* (2008.01)
*H04W 48/16* (2009.01)
*H04W 48/10* (2009.01)
*H04W 4/06* (2009.01)
*H04W 88/16* (2009.01)

(52) U.S. Cl.
CPC ............. *H04W 48/16* (2013.01); *H04W 4/06* (2013.01); *H04W 48/10* (2013.01); *H04W 88/16* (2013.01)

(58) Field of Classification Search
CPC ....... H04W 48/16; H04W 4/06; H04W 48/10; H04W 88/16

USPC ......................................................... 455/434
See application file for complete search history.

(56) References Cited

U.S. PATENT DOCUMENTS

| 9,712,285 | B2* | 7/2017 | You | H04W 48/14 |
|---|---|---|---|---|
| 2004/0267876 | A1* | 12/2004 | Kakivaya | H04L 67/16 |
| | | | | 709/200 |
| 2006/0002320 | A1* | 1/2006 | Costa-Requena | H04L 12/189 |
| | | | | 370/312 |
| 2007/0078910 | A1* | 4/2007 | Bopardikar | G06F 11/1464 |
| 2014/0012967 | A1* | 1/2014 | Agarwal | H04L 67/16 |
| | | | | 709/223 |

(Continued)

OTHER PUBLICATIONS

Cheshire et al. Internet Engineering Task Force (IETF) Request for Comments: 6762, Feb. 2013.*

*Primary Examiner* — Mark G. Pannell
(74) *Attorney, Agent, or Firm* — Lee and Hayes, P.C.

(57) ABSTRACT

This disclosure describes methods and systems for a service discovery gateway to interoperate with a client device. The service discovery gateway receives a first message, originating from the client device. The message comprising at least a service discovery query to the service discovery gateway. Based at least in part on receiving the first message, the service discovery gateway sends a second message comprising at least a first indication of at least one service provider corresponding to the service discovery query. The service discovery gateway determines a condition is met based at least in part on an elapsed time associated with the second message. The service discovery gateway sends a third message based at least in part on the determining, the third message comprising at least a second indication of at least one service provider corresponding to the service discovery query.

20 Claims, 7 Drawing Sheets

(56) References Cited

U.S. PATENT DOCUMENTS

| | | | |
|---|---|---|---|
| 2014/0214958 A1* | 7/2014 | Cheshire | H04L 61/1511 |
| | | | 709/204 |
| 2017/0317938 A1* | 11/2017 | Abraham | H04W 52/0219 |
| 2019/0021044 A1* | 1/2019 | Pang | H04W 40/246 |
| 2020/0137173 A1* | 4/2020 | Agarwal | H04L 61/1511 |
| 2020/0260161 A1* | 8/2020 | Yang | H04H 60/73 |

* cited by examiner

PREDICTIVE SERVICE ADVERTISEMENTS BY SERVICE DISCOVERY GATEWAY

RELATED APPLICATIONS

This application claims priority to Indian Provisional Application No. 202041018523, filed Apr. 30, 2020, titled "QUERY-LESS METHOD WITH PROACTIVE MDNS ADVERTISEMENTS TO CLIENTS FROM GATEWAY," the entirety of which is incorporated herein by reference.

TECHNICAL FIELD

The present disclosure relates generally to the advertisement of services by a service discovery gateway and, more specifically, to a methodology for predictive advertisement of services by a service discovery gateway.

BACKGROUND

The pervasive use of mobile devices may allow end-users to be constantly "connected." However, the use of mobile devices also brings challenges such as WiFi accessibility, battery longevity and the ability to utilize network-based services, like printer services, wherever the user happens to be. Services may be, for example, network-shared resources that are registered using a service registration protocol, such as is described at Appendix A of Request for Comments (RFC) 6763, "Domain Name System—Service Discovery (DNS-SD)," dated February 2013.

To facilitate the ability for an end user device to discover services that have been registered on a network, various Service Discovery protocols have been introduced. One example is the DNS-SD protocol described in RFC 6763. RFC 6763 describes a methodology for an end-user device to use standard DNS programming interfaces, servers, and packet formats to query for available services.

One example implementation of DNS-SD is a product offered by Apple, Inc., known as Bonjour®. The Bonjour methodology utilizes DNS-SD, in conjunction with multicast DNS (mDNS). mDNS is described in RFC 6762, "Multicast DNS," dated February 2013. The Bonjour methodology utilizes DNS-SD to add an abstraction layer over mDNS, enabling an end user device to discover services on a local network without initially knowing any service names or what devices on the network offer registered services. That is, Bonjour implements what is known as a zero-configuration networking. Zero configuration networking allows for automatic creation of a network of devices without having to manually configure, for example, a Dynamic Host Configuration Protocol (DHCP) server, DNS services, or network settings for each device to be connected to that network.

Bonjour operates at Layer 2 of the Open Systems Interconnection (OSI) network layer model and is focused on smaller networks, such as home networks. Using Bonjour, an end user device may make a multicast query for available services, and the devices that offer the available services provide a multicast response. Due to limitations of mDNS, Bonjour may be constrained for use within a single virtual Local Area Network (VLAN). That is, end user devices using a basic implementation of Bonjour may not be able to discover services across multiple VLANs. For example, enterprise networks such as may be utilized on a corporate campus, with multiple buildings, may utilize multiple VLANs. The VLANs, which operate at Layer 2, may be connected by Layer 3-aware network devices to cover an entire corporate campus. With Bonjour and a standard implementation of mDNS, an end user device may not be able to discover services, such as provided by a printer or a streaming media device, operating on a different VLAN in a different building of the campus.

Techniques that extend the use of mDNS to allow end user devices to issue a query for available services across multiple VLANs. With an increased number of end user devices and available services, these techniques may result in an increase in network traffic for the queries and responses.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes methods and systems for a service discovery gateway to interoperate with a client device. The methods and systems include an operation, by the service discovery gateway, of receiving a first message. The first message originates from the client device. The message comprising at least a service discovery query to the service discovery gateway. The methods and systems further include an operation, by the service discovery gateway and based at least in part on receiving the first message, of sending a second message comprising at least a first indication of at least one service provider corresponding to the service discovery query. The methods and systems further include an operation of determining a condition is met based at least in part on an elapsed time associated with the second message. The methods and systems further include an operation, by the service discovery gateway, of sending a third message based at least in part on the determining, the third message comprising at least a second indication of at least one service provider corresponding to the service discovery query.

This disclosure also describes method and system for a client device to interoperate with a service discovery gateway. The methods and system include an operation, by the client device, of sending a first message. The first message comprises at least a service discovery query to the service discovery gateway. The methods and systems further include an operation of receiving a second message. The second message originates at the service discovery gateway. The second message comprises at least a first indication of at least one service provider corresponding to the service discovery query. The methods and systems further include an operation of, by the client device, setting a condition including at least an elapsed time associated with the second message. The methods and system further include an operation of, by the client device, receiving a third message. The third message originates at the service discovery gateway prior to occurrence of the condition. The third message comprises at least a second indication of at least one service provider corresponding to the service discovery query.

Additionally, the techniques described herein may be performed by a system and/or device having non-transitory computer-readable media storing computer-executable instructions that, when executed by one or more processors, performs the methods described herein.

Example Embodiments

There are a number of approaches to support a Bonjour-like service discovery methodology across a multiple VLAN network, where Layer 3-aware network devices route network traffic among the VLANs. The Layer 3-aware network devices may include, for example, wireless LAN controllers (WLCs) for wireless deployments and/or Service Discovery Gateway (SDG)/Service Peers (SP) for wired deployments.

One approach to support a Bonjour-like discovery methodology across a multiple VLAN network allows the Layer 3-aware network devices to forward service advertisements to other VLANs. Furthermore, the Layer 3-aware network devices may forward service discovery queries, such as mDNS queries, to other VLANs. For example, a Layer 3-aware network device may act as a pass-through for the service advertisements and/or service discovery queries, allowing "bridging" of Layer 2 services across Layer 3 boundaries. Using this approach, service discovery queries and responses may increase as the size of the network increases, which may limit the scalability of this approach.

Another approach is for Layer 3-aware network devices to take a more active role in service discovery by maintaining a directory of the learned services from all the connected VLANs. The Layer 3-aware network devices may include devices that route network traffic among the VLANs and/or may include a separate hardware or virtual appliance. More generally, this approach is known as a service discovery gateway approach. A benefit of the service discovery gateway approach may be that a Layer 3-aware network device, implementing a service discovery gateway, can respond to service discovery queries from end-user devices. For example, a service discovery gateway may act as a proxy for services that are not local to the VLAN of which a querying end user device is a member.

For example, a service discovery gateway may operate in some respects as a standard Bonjour client. The service discovery gateway may query for available services on the VLANs of a network and pre-populate (cache) a local directory of services based on the responses from services on those VLANs. When an end user device then queries for services, the service discovery gateway may respond directly, without having to pass the query on to the other VLANs.

In accordance with Section 5.2 of RFC 6762, an end user device may make continuous ongoing service discovery queries. For example, Section 5.2 of RFC 6762 states:

When a Multicast DNS querier receives an answer, the answer contains a TTL value that indicates for how many seconds this answer is valid. After this interval has passed, the answer will no longer be valid and SHOULD be deleted from the cache. Before the record expiry time is reached, a Multicast DNS querier that has local clients with an active interest in the state of that record (e.g., a network browsing window displaying a list of discovered services to the user) SHOULD reissue its query to determine whether the record is still valid.

Section 5.2 of RFC 6762 goes on to state:

The querier should plan to issue a query at 80% of the record lifetime, and then if no answer is received, at 85%, 90%, and 95%. If an answer is received, then the remaining TTL is reset to the value given in the answer, and this process repeats for as long as the Multicast DNS querier has an ongoing interest in the record.

The continuous ongoing service discovery queries may interfere with other network traffic, and it may be desirable to limit the ongoing service discovery queries. On the other hand, it remains desirable that client devices be able to have an up-to-date record of available services.

It may therefore be advantageous for a service discovery gateway to anticipate the ongoing service discovery queries. For example, the service discovery gateway may be aware of how the client devices determine when to originate subsequent service discovery queries. For example, the service discovery gateway may include the TTL value in a response to an original service discovery query. The service discovery gateway may be aware that a client device that originated the original service discovery query is configured as described in RFC 6762 to utilize the TTL value in the response to determine when to reissue the service discovery query.

The service discovery gateway may be configured to use the awareness of how the client device is configured to utilize the TTL value to determine when to reissue the service discovery query. For example, the service discovery gateway may be configured to predictively provide a subsequent response to the service discovery query prior to the client device originating a subsequent service discovery query. In this way, knowledge by the client device of the available services remains up-to-date, without the client device originating a subsequent service discovery query.

In some examples, the service discovery gateway may determine when to provide the subsequent response to the service discovery query based on one or more TTL values the service discovery gateway provided in prior responses to the service discovery query. In some examples, the service discovery gateway may determine when to provide the subsequent response to the service discovery query based on a parameter that may, for example, be configured by a network administrator and/or may have a default value, such as if the parameter is not configured.

For networks the utilize the Bonjour product and/or variations of mDNS, the techniques may comply with the various protocols such that, for example, devices in the network remain interoperable. For example, client devices may not need to be reconfigured to advantageously utilize the techniques to reduce subsequent service discovery queries originated by the client devices.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
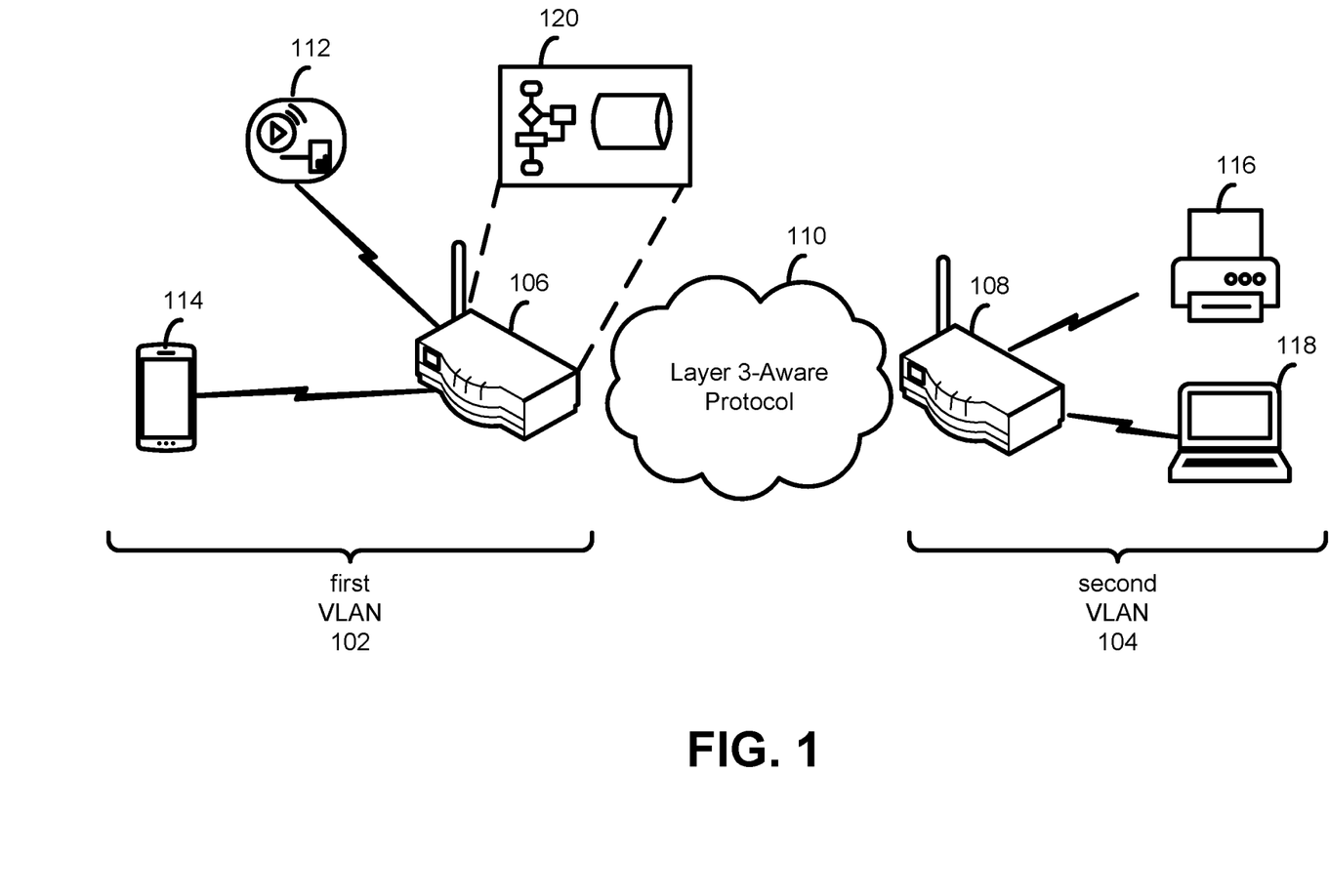
FIG. 1 is a diagram illustrating an example network including at least a first VLAN and a second VLAN.

FIG. 1 is a diagram illustrating an example network 100 including at least a first VLAN 102 and a second VLAN 104. Communication within each of the first VLAN 102 and the second VLAN 104 is "link-local." That is, a host's link-local network includes itself and all other hosts that can exchange packets without IP header data being modified. In other words, the link-local domain includes hosts sharing a single layer 2 domain/VLAN. In the network 100, a first controller 106 and a second controller 108 are Layer 3-aware, such that a device in the first VLAN 102 can communicate with a device in the second VLAN 104 at Layer 3 using a Layer 3-aware protocol 110, such as by IP routing at the network layer. The network 100 is an example, and other network configurations are possible, including network configurations that utilize fewer or more VLANs.

Referring still to FIG. 1, the first VLAN 102 includes a streaming media device 112 and a smart phone device 114 in communication with the first controller 106. The second VLAN 104 includes a printer 116 and a notebook computer 118 in communication with the second controller 108. The streaming media device 112 and the printer 116 may register services that they can offer by issuing service advertisements. The service advertisements may, for example, be Bonjour (i.e., mDNS) service advertisements that include at least a service name and a service type. Each service advertisement may, for example, be included in a multicast message to all clients in the one of the first VLAN 102 or the second VLAN 104 of which the device advertising the service is a member.

The mDNS addresses used in the service advertisements are link-local multicast addresses, and the service advertisements are only forwarded within the local Layer 2 domain. Link-local multicast is meant to stay local by design. As discussed above, Bonjour was originally developed for use primarily with home networks. As such, since most home networks consist of a single Layer 2 domain, the link-local limitation of mDNS rarely posed any practical deployment constraints. However in an enterprise context, with large numbers of (wired and wireless) Layer 2 domains, this limitation severely handicaps Bonjour functionality, as Bonjour clients would only see locally-hosted services and would not be able to see or connect to services hosted on other Layer 2 domains.

To address this limitation, a service discovery gateway feature may be utilized. The service discovery gateway feature may encapsulate Layer 2 Bonjour messages within Layer 3 packets for transmission to other VLANs. For example, the first controller 106 may implement a service discovery gateway feature 120. The service discovery gateway feature 120 may snoop and cache all service advertisements across multiple VLANs and can also be configured to reply, in some cases selectively, to service queries across multiple VLANs. For example, the service discovery gateway feature 120 of the first controller 106 may implement functionality to snoop the service advertisements issued by the streaming media device 112 and the printer 116. Furthermore, the service discovery gateway feature 120 of the first controller 106 may cache all service advertisements across the first VLAN 102 and the second VLAN 104. In addition, the service discovery gateway feature 120 of the first controller 106 may be configured to reply to service discovery queries. The service discovery gateway feature 120 of the first controller 106 may encapsulate service advertisements, service queries and responses within Layer 3 packets for transmission to the second VLAN 104.

Furthermore, the service discovery gateway feature 120 of the first controller 106 may be configured to anticipate subsequent service discovery queries, after initial service discovery queries, and to provide service information, that might otherwise be in a reply to a subsequent service discovery query, without a client device actually making a subsequent service discovery query. In this way, network traffic comprising subsequent service discovery queries may be reduced.

For example, the service discovery gateway feature 120 of the first controller 106, listening for service advertisements, may hear a printer service advertisement from the printer 116. The service discovery gateway feature 120 of the first controller 106 may process the printer service advertisement from the printer 116 and save an indication of the printer service of the printer 116. For example, the indication of the printer service of the printer 116 may include a name of the printer service and an indication of the second VLAN 104, on which the printer 116 is located. Similarly, the service discovery gateway feature 120 of the first controller 106, listening for service advertisements, may hear a streaming media service advertisement from the streaming media device 112. The service discovery gateway feature 120 of the first controller 106 may process the streaming media service advertisement from the streaming media device 112 and save an indication of the streaming media service of the streaming media device 112. For example, the indication of the streaming media service of the streaming media device 112 may include a name of the streaming media service and an indication of the first VLAN 102, on which the streaming media device 112 is located. In some examples, the service discovery gateway feature 120 of the first controller 106 stores the indications of the printer service of the printer 116 and of the streaming media service of the streaming media device 112 in a cache of the service discovery gateway feature 120.

In addition, the service discovery gateway feature 120 of the first controller 106, listening for service discovery queries, may hear a printer service discovery query from the smart phone device 114. The service discovery gateway feature 120 of the first controller 106 may process the printer service discovery query by checking a cache or other storage of the service discovery gateway feature 120 for printer services. The service discovery gateway feature may respond to the printer service discovery query with a unicast message to the smart phone device 114. The unicast message may include an indication of the printer services from the cache or other storage of the service discovery gateway feature 120.

Furthermore, the unicast message may include an indication of a time-to-live (TTL) value or values for the indication of the printer services, which is an indication of an expiration time for the indication of the printer services. The smart phone device 114 may be configured to process the TTL value, such as is described in RFC 6762, to determine when to transmit a subsequent printer service discovery query.

The service discovery gateway feature 120 of the first controller 106 may be configured to predict the subsequent printer service discovery queries and to provide printer service information to the smart phone device 114 that might otherwise be in a reply to a printer service discovery query. This is without the smart phone device 114 actually making the subsequent printer service discovery query. In this way, network traffic comprising service discovery queries may be reduced. For example, the service discovery gateway feature 120 may be aware of how the smart phone device 114 is configured to process the TTL value in the unicast message response the service discovery gateway feature 120 sends to the smart phone device 114. For example, the service discovery gateway feature 120 may be aware that the smart phone device 114 is configured to make the subsequent printer service discovery query when the TTL expires. The service discovery gateway feature 120 may provide printer service information to the smart phone device 114 prior to the expiration of the TTL.

In another example, the service discovery gateway feature 120 of the first controller 106 may utilize a configuration parameter value of the service discovery gateway feature 120 to evaluate when to provide printer service information to the smart phone device 114 that might otherwise be in a reply to a subsequent printer service discovery query. For example, an administrator of the network 100 may configure a Service-Query-Response Timer parameter. In operation, the service discovery gateway feature 120 may subsequently provide the printer service information to the smart phone device 114 based on an elapsed time since last providing the printer service information to the smart phone device 114 relative to the Service-Query-Response Timer parameter. This may include, for example, the service discovery gateway feature 120 subsequently providing the printer service information to the smart phone device 114 based on an elapsed time since last providing the printer service information to the smart phone device 114 matching or exceeding the Service-Query-Response Timer parameter.

In some examples, the service discovery gateway feature 120 of the first controller 106 may track and provide subsequent responses at a query-by-query granularity. For example, the service discovery gateway feature 120 of the first controller 106 may hear a printer service discovery query from the smart phone device 114. The service discovery gateway feature 120 of the first controller 106 may also hear a streaming media service discovery query from the smart phone device 114. In some examples, the service discovery gateway feature 120 of the first controller 106 may track and provide subsequent responses to the printer service discovery query separately from tracking and providing subsequent responses to the streaming media service query. For example, to determine when to provide a subsequent response to the printer service query, the service discovery gateway feature 120 of the first controller 106 may compare an elapsed time since providing a previous response, to a printer service discovery query, to a TTL in the previous response or to a configurable Service-Query-Response Timer parameter value. Separately, to determine when to provide a subsequent response to the streaming media service query, the service discovery gateway feature 120 of the first controller 106 may compare an elapsed time since providing a previous response, to a streaming media service discovery query, to a TTL in the previous response or to a configurable Service-Query-Response Timer parameter value.

The tracking and providing subsequent responses at a query-by-query granularity may also apply across querying client devices. For example, the service discovery gateway feature 120 of the first controller 106 may hear a printer service discovery query from the smart phone device 114. The service discovery gateway feature 120 of the first controller 106 may also hear a printer service discovery query from the notebook computer 118. In some examples, the service discovery gateway feature 120 of the first controller 106 may track and provide subsequent responses to the printer service discovery query from the smart phone device 114 separately from tracking and providing subsequent responses to the printer service discovery query from the notebook computer 118. For example, to determine when to provide a subsequent response to the printer service query from the smart phone device 114, the service discovery gateway feature 120 of the first controller 106 may compare an elapsed time since providing a previous response, to a printer service discovery query from the smart phone device 114, to a TTL in the previous response or to a configurable Service-Query-Response Timer parameter. Separately, to determine when to provide a subsequent response to the printer service query from the notebook computer 118, the service discovery gateway feature 120 of the first controller 106 may compare an elapsed time since providing a previous response, to a printer service discovery query from the notebook computer 118, to a TTL in the previous response or to a configurable Service-Query-Response Timer parameter.

In other examples, the determination of when to provide a subsequent response to a particular query may be aggregated with a determination of when to provide a subsequent response to a different query. Referring to one of the previous examples, the service discovery gateway feature 120 of the first controller 106 may track and provide subsequent responses to the printer service discovery query from the smart phone device 114 in aggregation with tracking and providing subsequent response to the streaming media service query from the smart phone device 114. Referring to another of the previous examples, the service discovery gateway feature 120 of the first controller 106 may track and provide subsequent responses to the printer service discovery query from the smart phone device 114 in aggregation with tracking and providing subsequent responses to the printer service discovery query from the notebook computer 118. In these examples, the service discovery gateway feature 120 of the first controller 106 may, in aggregation, track and provide subsequent responses to two service discovery queries. In other examples, the service discovery gateway feature 120 of the first controller 106 may, in aggregation, track and provide subsequent responses to more than two service discovery queries.

In some examples, in practice, when the service discovery gateway feature 120 of the first controller 106, in aggregation, tracks and provides subsequent responses to multiple service discovery queries, the service discovery gateway feature 120 of the first controller 106 may slightly stagger, in time, how it provides the subsequent responses to the multiple service discovery queries. This may, in practice, help to avoid network congestion and/or other issues that may arise from the service discovery gateway feature 120 of the first controller 106 providing the subsequent responses to the multiple service discovery queries too close together in time.

Figure 2:
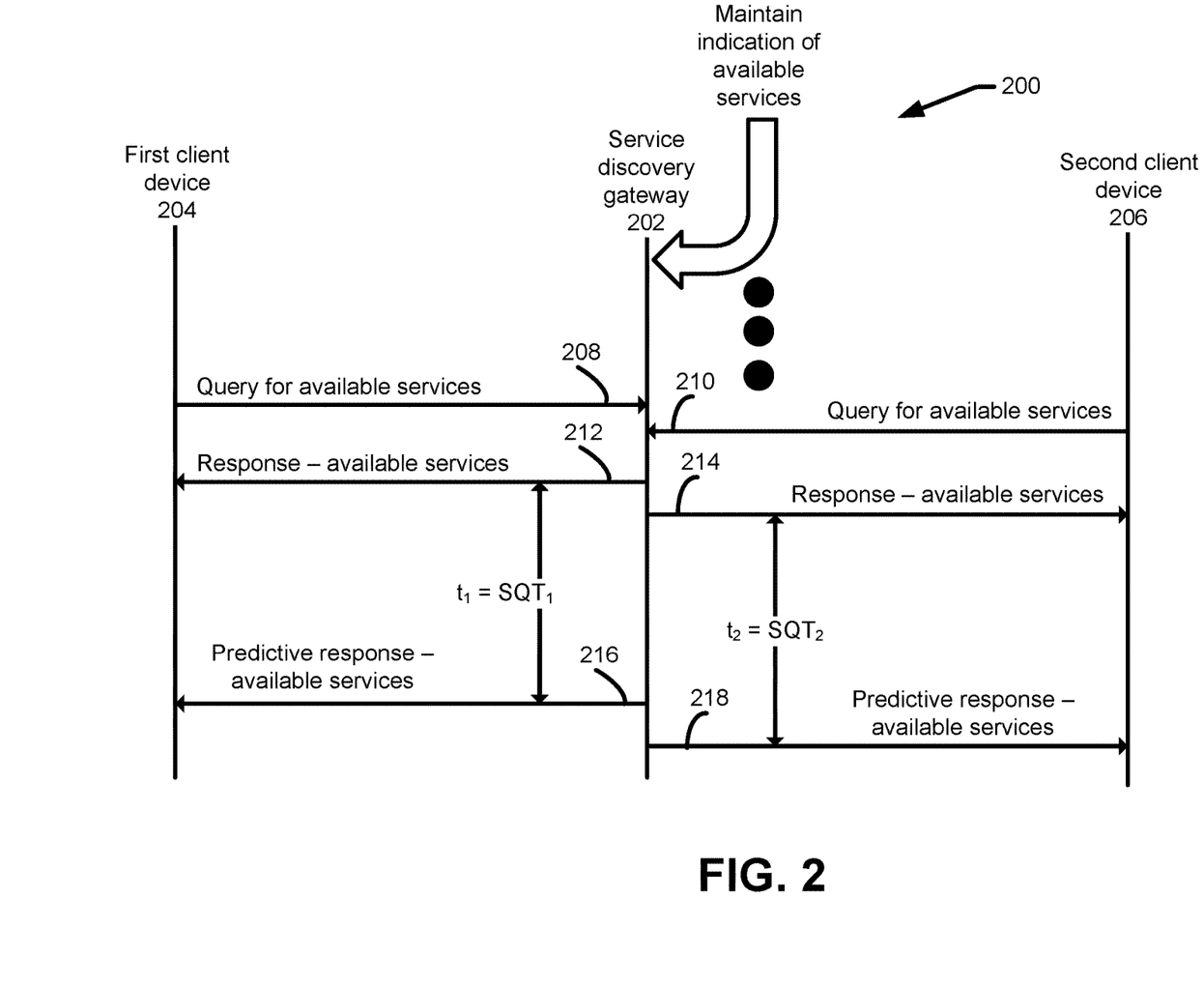
FIG. 2 illustrates a first example timing for interoperation of a service discovery gateway, a first client device and a second client device.

FIG. 2 illustrates an example timing 200 for interoperation of a service discovery gateway 202, a first client device 204 and a second client device 206. For example, the service discovery gateway 202 may be the service discovery gateway feature 120 of the first controller 106. Further, for example, the first client device 204 may be the smart phone device 114 and the second client device 206 may be the notebook computer 118. Time progresses in the timing 200 from top to bottom of FIG. 2. As shown in FIG. 2, the service discovery gateway 202 is maintaining an indication of available services, for example, as devices such as a streaming media device or a printer device advertise available services.

In the FIG. 2 timing 200, evaluation by the service discovery gateway 202 of when to send a predictive subsequent response to one of the first client device 204 and the second client device 206 is based at least in part on a separate configurable parameter value for a respective one of a query from the first client device 204 and a query from the second client device 206. Referring to the timing 200, the first client device 204 originates a service discovery query 208 that is received by the service discovery gateway 202. For example, the first client device 204 may originate a printer services discovery query or a streaming media service discovery query that is received by the service discovery gateway 202. Furthermore, the second client device 206 originates a service discovery query 210 that is received by the service discovery gateway 202. For example, the second client device 206 may originate a printer services discovery query or a streaming media service discovery query that is received by the service discovery gateway 202.

The service discovery gateway 202 provides a response 212 comprising at least an indication of at least one service provider corresponding to the service discovery query 208. For example, if the service discovery query 208 is a printer services discovery query, the response 212 comprises at least an indication of at least one service provider that is registered to provide printer services. Furthermore, the service discovery gateway 202 provides a response 214 comprising at least an indication of at least one service provider corresponding to the service discovery query 210. For example, the response 212 may be a unicast message addressed by the service discovery gateway 202 to the first client device 204. Furthermore, for example, the response 214 may be a unicast message addressed by the service discovery gateway 202 to the second client device 206.

The service discovery gateway 202 provides a predictive subsequent response 216 comprising at least an indication of at least one service provider corresponding to the service discovery query 208. The service discovery gateway 202 provides the predictive subsequent response 216 an elapsed time $t_1$ since providing the response 212. In the FIG. 2 example, the elapsed time $t_1$ is equal to the configured Service-Query-Response Timer parameter for the response 212. The elapsed time $t_1$ may, in some examples, be based at least in part on a different event related to the response 212 than a time at which the service discovery gateway 202 provides the response 212. For example, the response 212 may be acknowledged by the first client device 204, and the elapsed time $t_1$ may be based at least in part on the time the service discovery gateway 202 receives the acknowledgement.

Referring still to FIG. 2, the service discovery gateway 202 provides a predictive subsequent response 218 comprising at least an indication of at least one service provider corresponding to the service discovery query 210. The service discovery gateway 202 provides the predictive subsequent response 218 an elapsed time $t_2$ since providing the response 214. In the FIG. 2 example, the elapsed time $t_2$ is equal to the configured Service-Query-Response Timer parameter for the response 214. The elapsed time $t_2$ may, in some examples, be based at least in part on a different event related to the response 214 than a time at which the service discovery gateway 202 provides the response 214. For example, the response 214 may be acknowledged by the second client device 206, and the elapsed time $t_2$ may be based at least in part on the time the service discovery gateway 202 receives the acknowledgement.

By receiving the predictive subsequent response 216 and the predictive subsequent response 218, the first client device 204 and/or the second client device 206, respectively, may receive updates to the service discovery query 208 and/or the service discovery query 210, respectively, without actually making a subsequent service discovery query. In this way, network traffic comprising service discovery queries may be reduced.

Figure 3:
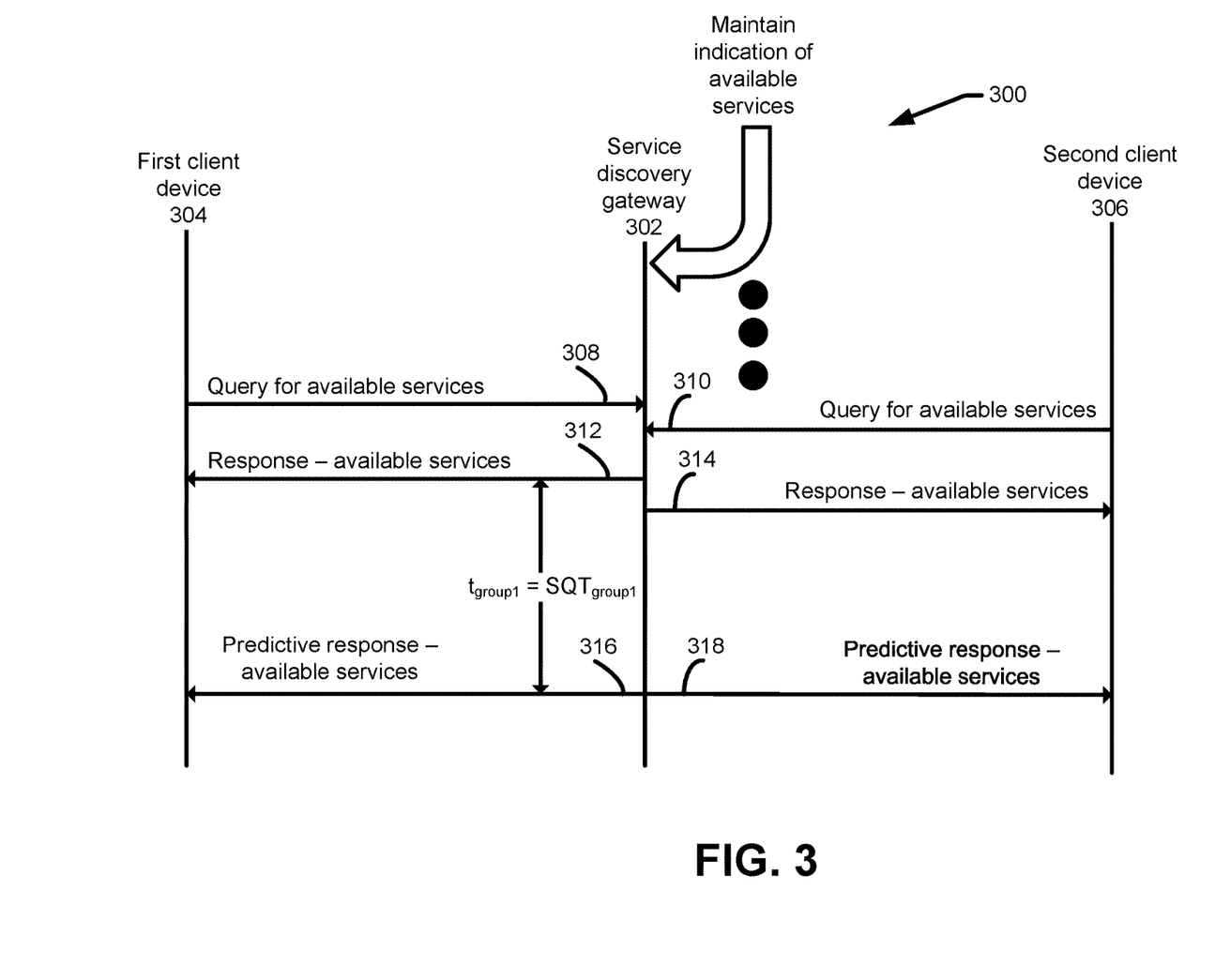
FIG. 3 illustrates a second example timing for interoperation of a service discovery gateway, a first client device and a second client device.

FIG. 3 illustrates an example timing 300 for interoperation of a service discovery gateway 302, a first client device 304 and a second client device 306. For example, the service discovery gateway 302 may be the service discovery gateway feature 120 of the first controller 106. Further, for example, the first client device 304 may be the smart phone device 114 and the second client device 306 may be the notebook computer 118. Time progresses in the timing 300 from top to bottom of FIG. 3. As shown in FIG. 3, the service discovery gateway 302 is maintaining an indication of available services, for example, as devices such as a streaming media device or a printer device advertise available services.

In the FIG. 3 timing 300, evaluation by the service discovery gateway 302 of when to send a predictive subsequent response to one of the first client device 304 and the second client device 306 is based at least in part on configurable value applied to both a query from the first client device 304 and a query from the second client device 306. Referring to the timing 300, the first client device 304 originates a service discovery query 308 that is received by the service discovery gateway 302. For example, the first client device 304 may originate a printer services discovery query or a streaming media service discovery query that is received by the service discovery gateway 302. Furthermore, the second client device 306 originates a service discovery query 310 that is received by the service discovery gateway 302. For example, the second client device 306 may originate a printer services discovery query or a streaming media service discovery query that is received by the service discovery gateway 302.

The service discovery gateway 302 provides a response 312 comprising at least an indication of at least one service provider corresponding to the service discovery query 308. For example, if the service discovery query 308 is a printer services discovery query, the response 312 comprises at least an indication of at least one service provider that is registered to provide printer services. Furthermore, the service discovery gateway 302 provides a response 314 comprising at least an indication of at least one service provider corresponding to the service discovery query 310. For example, the response 312 may be a unicast message addressed by the service discovery gateway 302 to the first client device 304. Furthermore, for example, the response 314 may be a unicast message addressed by the service discovery gateway 302 to the second client device 306.

The service discovery gateway 302 provides a predictive subsequent response 316 comprising at least an indication of at least one service provider corresponding to the service discovery query 308. The service discovery gateway 202 provides the predictive subsequent response 316 an elapsed time $t_{group1}$ since providing the response 312. In the FIG. 3 example, the elapsed time $t_{group1}$ is equal to the configured Service-Query-Response Timer parameter for the response 312. The elapsed time $t_{group1}$ may, in some examples, be based at least in part on a different event related to the response 312 than a time at which the service discovery gateway 302 provides the response 312. For example, the response 312 may be acknowledged by the first client device 304, and the elapsed time $t_{group1}$ may be based at least in part on the time the service discovery gateway 302 receives the acknowledgement.

Referring still to FIG. 3, the service discovery gateway 302 provides a predictive subsequent response 318 comprising at least an indication of at least one service provider corresponding to the service discovery query 310. The service discovery gateway 202 provides the predictive subsequent response 318 at the elapsed time $t_{group1}$ since providing the response 312. By determining times of predictive subsequent responses in groups, this may reduce processing by the service discovery gateway 302 compared to determining times of predictive subsequent responses individually. The service discovery gateway 302 may slightly stagger, in time, how it provides the predictive subsequent response 316 and the predictive subsequent response 318. This may, in practice, help to avoid network congestion and/or other issues that may arise from the service discovery gateway 302 providing the predictive subsequent response 316 and the predictive subsequent response 318 too close together in time.

By receiving the predictive subsequent response 316 and the predictive subsequent response 318, the first client device 304 and/or the second client device 306, respectively, may receive updates to the service discovery query 308 and/or the service discovery query 310, respectively, without actually making a subsequent service discovery query. In this way, network traffic comprising service discovery queries may be reduced.

Figure 4:
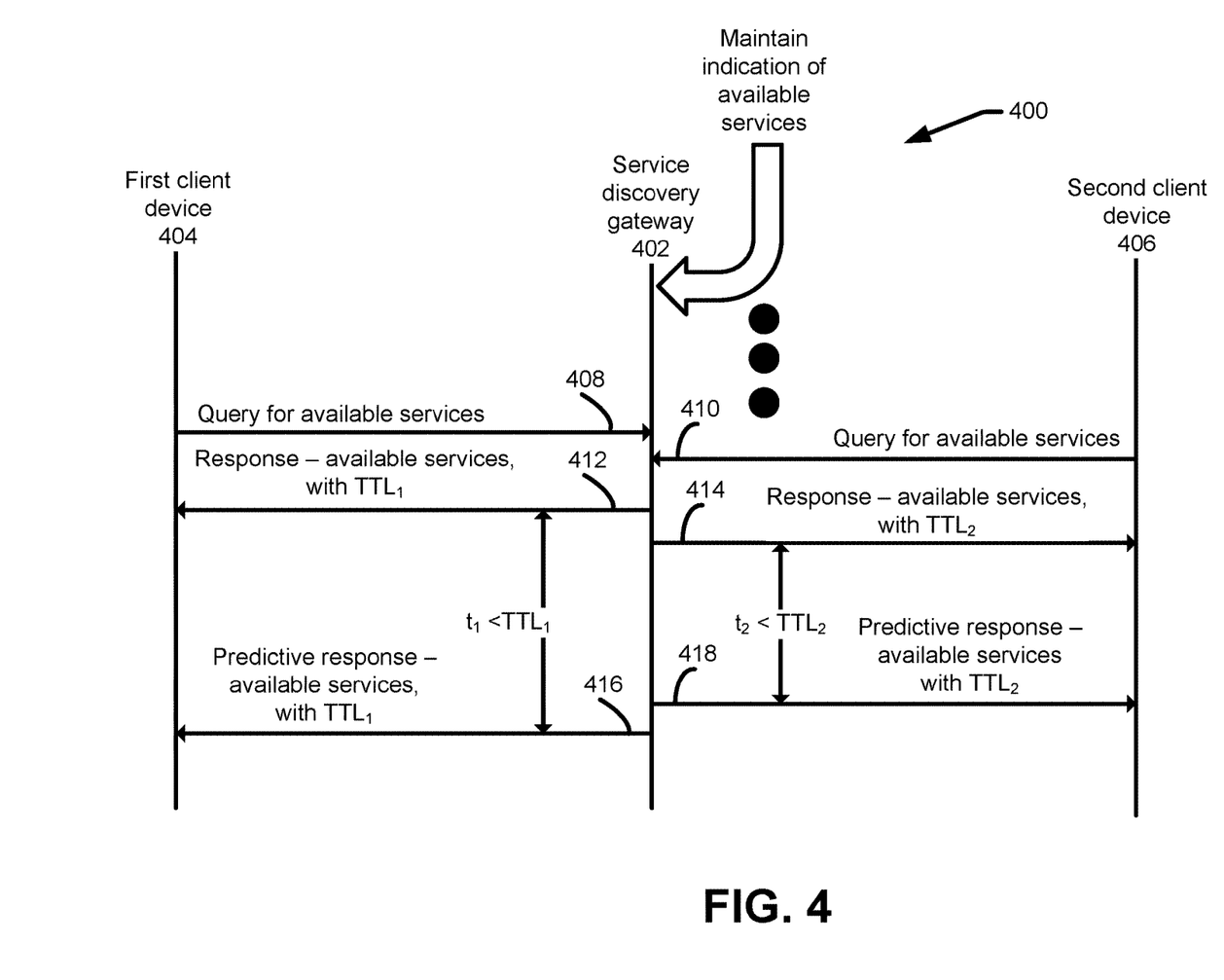
FIG. 4 illustrates a third example timing for interoperation of a service discovery gateway, a first client device and a second client device.

FIG. 4 illustrates an example timing 400 for interoperation of a service discovery gateway 402, a first client device 404 and a second client device 406. For example, the service discovery gateway 402 may be the service discovery gateway feature 120 of the first controller 106. Further, for example, the first client device 404 may be the smart phone device 114 and the second client device 406 may be the notebook computer 118. Time progresses in the timing 400 from top to bottom of FIG. 4. As shown in FIG. 4, the service discovery gateway 404 is maintaining an indication of available services, for example, as devices such as a streaming media device or a printer device advertise available services.

In the FIG. 4 timing 400, evaluation by the service discovery gateway 402 of when to send a predictive subsequent response to one of the first client device 404 and the second client device 406 is based at least in part on a separate TTL value for a respective one of a response 412 to the first client device 404 and a response 414 to the second client device 406. Referring to the timing 400, the first client device 404 originates a service discovery query 408 that is received by the service discovery gateway 202. For example, the first client device 404 may originate a printer services discovery query or a streaming media service discovery query that is received by the service discovery gateway 402. Furthermore, the second client device 406 originates a service discovery query 410 that is received by the service discovery gateway 402. For example, the second client device 406 may originate a printer services discovery query or a streaming media service discovery query that is received by the service discovery gateway 402.

The service discovery gateway 402 provides a response 412 comprising at least an indication of at least one service provider corresponding to the service discovery query 408. For example, if the service discovery query 408 is a printer services discovery query, the response 412 comprises at least an indication of at least one service provider that is registered to provide printer services. Furthermore, the service discovery gateway 402 provides a response 414 comprising at least an indication of at least one service provider corresponding to the service discovery query 410. For example, the response 412 may be a unicast message addressed by the service discovery gateway 402 to the first client device 404. Furthermore, for example, the response 414 may be a unicast message addressed by the service discovery gateway 402 to the second client device 406.

The service discovery gateway 402 provides a predictive subsequent response 416 comprising at least an indication of at least one service provider corresponding to the service discovery query 408. The service discovery gateway 402 provides the predictive subsequent response 416 an elapsed time $t_1$ since providing the response 412. In the FIG. 4 example, the elapsed time $t_1$ is based on a $TTL_1$ value provided by the service discovery gateway 402 in the response 412. The first client device 404 normally uses the $TTL_1$ value to determine at what time to originate a subsequent service discovery query. In one example, the first client device 404 determines the elapsed time $t_1$ to be less than the $TTL_1$ value provided by the service discovery gateway 402 in the response 412. For example, the first client device 404 may determine the elapsed time $t_1$ to be eighty percent of the $TTL_1$ value provided by the service discovery gateway 402 in the response 412.

Referring still to FIG. 4, the service discovery gateway 402 provides a predictive subsequent response 418 comprising at least an indication of at least one service provider corresponding to the service discovery query 410. The service discovery gateway 402 provides the predictive subsequent response 418 an elapsed time $t_2$ since providing the response 414. In the FIG. 4 example, the elapsed time $t_2$ is based on a $TTL_2$ value provided by the service discovery gateway 402 in the response 414. The second client device 406 normally uses the $TTL_2$ value to determine at what time to originate a subsequent service discovery query. In one example, the second client device 406 determines the elapsed time $t_2$ to be less than the $TTL_2$ value provided by the service discovery gateway 402 in the response 414. For example, the second client device 406 may determine the elapsed time t2 to be eighty percent of the $TTL_2$ value provided by the service discovery gateway 402 in the response 414.

By receiving the predictive subsequent response 416 and the predictive subsequent response 418, the first client device 404 and/or the second client device 406, respectively, may receive updates to the service discovery query 408 and/or the service discovery query 410, respectively, without actually making a subsequent service discovery query. In this way, network traffic comprising service discovery queries may be reduced.

Figure 5:
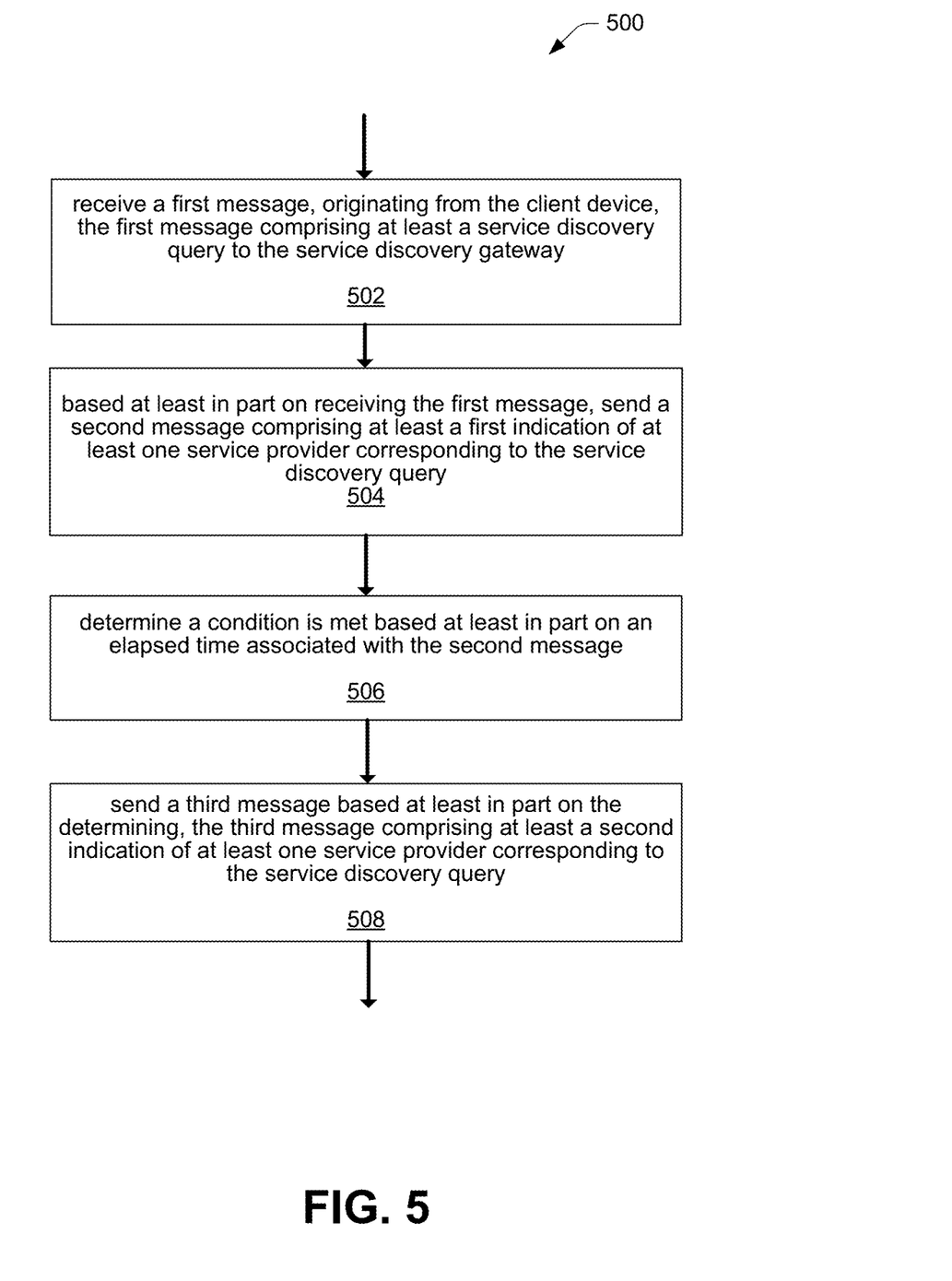
FIG. 5 is a flowchart illustrating a process by which a service discovery gateway may provide predictive subsequent responses to service discovery queries from client devices.

FIG. 5 is a flowchart illustrating a process 500 by which a service discovery gateway may provide predictive subsequent responses to service discovery queries from client devices. By providing the predictive subsequent responses, network traffic comprising service discovery queries may be reduced. For example, the service discovery gateway may be the service discovery gateway feature 120 of the first controller 106. Further, for example, the client device may be the smart phone device or the notebook computer 118.

At 502, the service discovery gateway receives a first message, originating from the client device. The first message comprises at least a service discovery query to the service discovery gateway. At 504, based at least in part on receiving the first message, the service discovery gateway sends a second message comprising at least a first indication of at least one service provider corresponding to the service discovery query. At 506, the service discovery gateway determines a condition is met based at least in part on an elapsed time associated with the second message. The condition may consider, for example, a Service-Query-Timer value and/or a TTL value.

At 508, the service discovery gateway sends a third message based at least in part on the determining. The third message comprises at least a second indication of at least one service provider corresponding to the service discovery query. The third message may be a predictive subsequent response to the service discovery query such that, for example, the client device need not originate a subsequent service discovery query.

Figure 6:
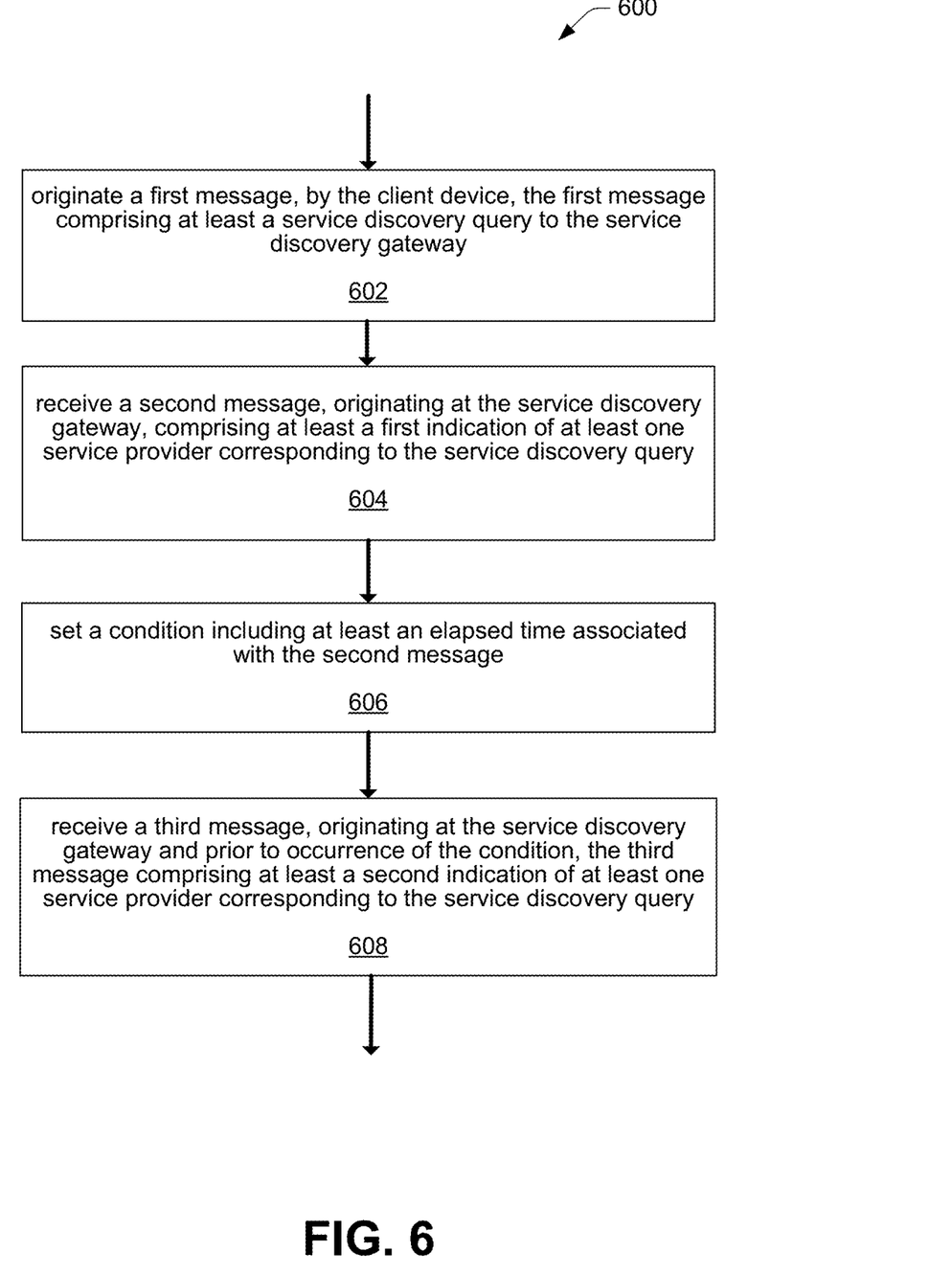
FIG. 6 is a flowchart illustrating a process by which a client device may receive predictive subsequent responses to service discovery queries from a service discovery gateway.

FIG. 6 is a flowchart illustrating a process 600 by which client devices receive predictive subsequent responses to service discovery queries from a service discovery gateway. By receiving the predictive subsequent responses, network traffic comprising service discovery queries may be reduced. For example, the service discovery gateway may be the service discovery gateway feature 120 of the first controller 106. Further, for example, the client device may be the smart phone device or the notebook computer 118.

At 602, the client device originates a first message. The first message comprises at least a service discovery query to the service discovery gateway. At 604, the client device receives a second message, originating at the service discovery gateway. The second message comprises at least a first indication of at least one service provider corresponding to the service discovery query. At 606, the client device sets a condition including at least an elapsed time associated with the second message. The condition may consider, for example, a TTL value in the second message.

At 608, the client device receives a third message. The third message originates at the service discovery gateway prior to occurrence of the condition. The third message comprises at least a second indication of at least one service provider corresponding to the service discovery query. The third message may be a predictive subsequent response to the service discovery query such that, for example, the client device need not originate a subsequent service discovery query.

Figure 7:
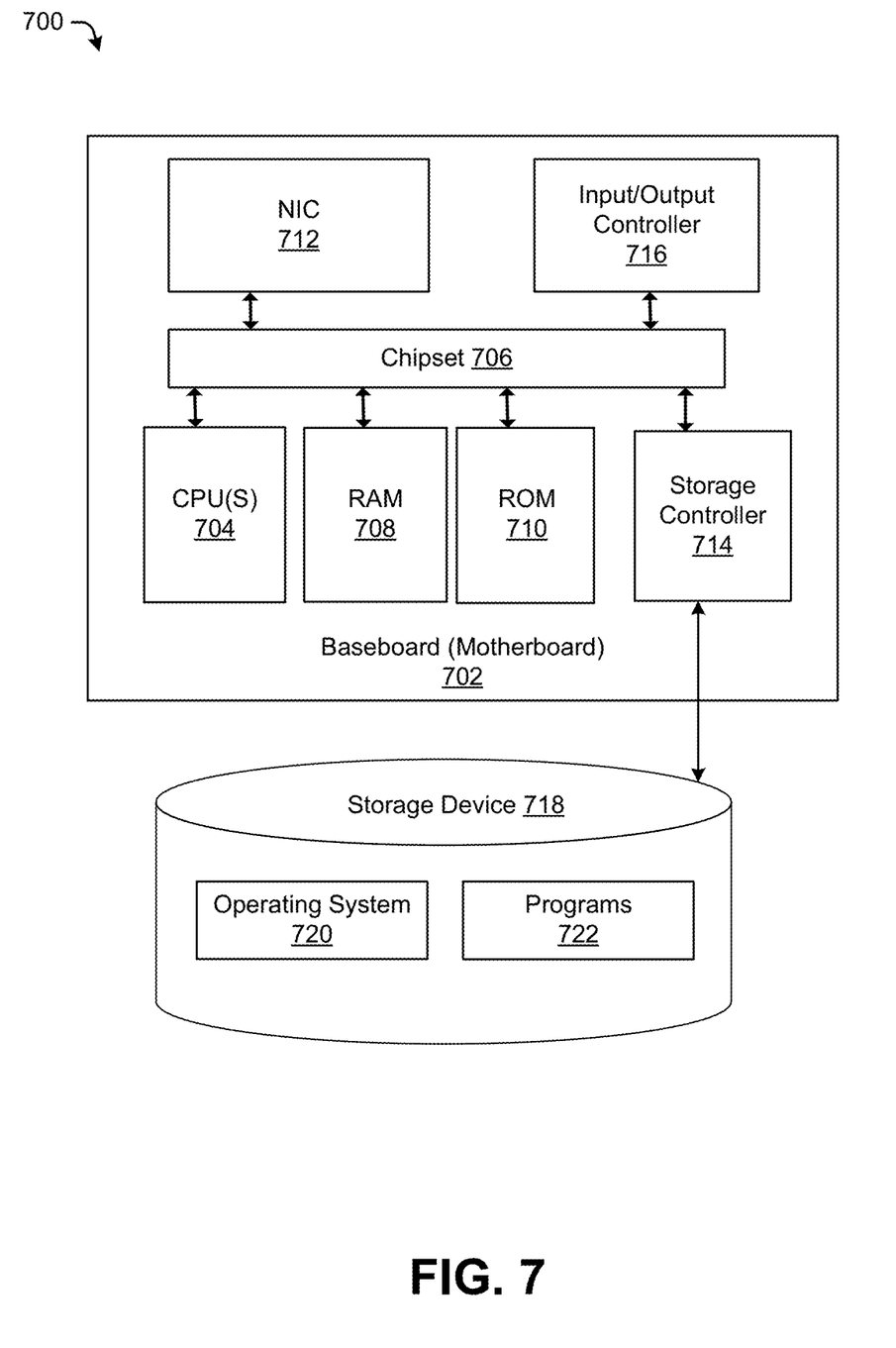
FIG. 7 illustrates an example computer architecture for a computer capable of executing program components for implementing the functionality described herein.

FIG. 7 illustrates an example computer architecture for a computer 700 capable of executing program components for implementing the functionality described above. The computer architecture shown in FIG. 7 illustrates an architecture of a server computer, workstation, desktop computer, laptop, tablet, network appliance, e-reader, smartphone, network switch, or other computing device, and can be utilized to execute any of the software components presented herein. The computer 700 may, in some examples, correspond to a network infrastructure device discussed herein.

The computer 700 includes a baseboard 702, or "motherboard," which may be a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be, for example, standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein. As illustrated in FIG. 7, the ROM 710 or NVRAM can also store data usable by the computer 700 to generate and/or process attestation information in messages exchanged among the computer 700 and other devices. In other examples, this data may be stored elsewhere, such as in RAM 708.

The computer 700 can operate in a networked environment using logical connections to remote computing devices and computer systems through a network. For example, the chipset 706 can include functionality for providing network connectivity through a Network Interface Controller (NIC) 712, such as a gigabit Ethernet adapter. The NIC 712 can connect the computer 700 to other computing devices over a network. It should be appreciated that multiple NICs 712 can be present in the computer 700, connecting the computer to other types of networks and remote computer systems. In some instances, the NICs 712 may include at least one ingress port and/or at least one egress port. An input/output controller 716 may be provided for other types of input/output.

The computer 700 can be connected to a storage device 718 that provides non-volatile storage for the computer. The storage device 718 can store an operating system 720, programs 722, and data, for example. The storage device 718 can be connected to the computer 700 through a storage controller 714 connected to the chipset 706. The storage device 718 can include one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description.

Examples of such factors can include, but are not limited to, the technology used to implement the physical storage units, whether the storage device 718 is characterized as primary or secondary storage, and the like. For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the storage device 718 described above, the computer 700 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 700.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method for a service discovery gateway to interoperate with a client device, comprising, by the service discovery gateway:
   maintaining, in a directory local to the service discovery gateway, a first indication of at least one service provider of services available on a first virtual local area network (VLAN) and on a second VLAN during a first time period;
   receiving a first message originating from the client device, the first message comprising at least a service discovery query to the service discovery gateway, the service discovery gateway being located on the first VLAN and the client device being located on the second VLAN;
   sending, based at least in part on receiving the first message, a second message to the client device comprising at least the first indication of the at least one service provider corresponding to the service discovery query;
   maintaining, in the directory local to the service discovery gateway, an updated indication of at least one service provider of the services available on the first VLAN and on the second VLAN during a second time period different from the first time period;
   determining a condition is met based at least in part on a predictive awareness of the service discovery gateway as to how the client device is configured to utilize a time-to-live (TTL) value; and
   sending, with the service discovery gateway, a third message to the client device prior to the client device originating a subsequent service discovery query based at least in part on the condition being met, the third message comprising at least the updated indication corresponding to the service discovery query, the updated indication including an identification of a service provider available of the at least one service provider providing a service corresponding to the service discovery query.

2. The method of claim 1, wherein the second message is a unicast message to the client device.

3. The method of claim 1, wherein:
   the determining is based at least in part on the elapsed time associated with the second message relative to the TTL value.

4. The method of claim 3, wherein:
   the determining is based at least in part on the elapsed time associated with the second message relative to a configurable service query time parameter.

5. The method of claim 1, wherein:
   the service discovery query is a multicast domain name system (mDNS) query.

6. The method of claim 5, wherein:
   the second message and the third message are mDNS response messages.

7. The method of claim 1, wherein:
   the first message is a multicast message.

8. A method for a client device to interoperate with a service discovery gateway, comprising, by the client device:
   originate a first message, from the client device, the first message comprising at least a service discovery query;
   receiving a second message, originating at the service discovery gateway at the client device, comprising at least a first indication of at least one service provider of services available on a first virtual local area network (VLAN) and on a second VLAN during a first time period, corresponding to the service discovery query, the service discovery gateway being located on the first VLAN and the client device being located on the second VLAN;
   setting a condition based at least in part on a predictive awareness of the service discovery gateway as to how the client device is configured to utilize a time-to-live (TTL) value; and
   receiving, from the service discovery gateway, a third message at the client device, originating at the service discovery gateway and prior to occurrence of the condition, the third message comprising at least an updated indication corresponding to the service discovery query, the updated indication including an identification of a service provider available of at least one service provider providing a service corresponding to the service discovery query on the first VLAN and on the second VLAN during a second time period different from the first time period.

9. The method of claim 8, wherein the second message is a unicast message to the client device.

10. The method of claim 8, wherein:
setting the condition is based at least in part on the elapsed time associated with the second message relative to the TTL value.

11. The method of claim 8, wherein:
the service discovery query is a multicast domain name system (mDNS) query.

12. The method of claim 11, wherein:
the second message and the third message are mDNS response messages.

13. The method of claim 8, wherein:
the first message is a multicast message.

14. A service discovery gateway, comprising:
one or more processors; and
one or more non-transitory computer-readable media storing computer-executable instructions that, when executed by the one or more processors, cause the one or more processors to perform operations of:
- in a directory local to the service discovery gateway, maintaining a first indication of at least one service provider of services available on a first virtual local area network (VLAN) and on a second VLAN during a first time period;
- receiving a first message, originating from a client device, the first message comprising at least a service discovery query to the service discovery gateway, the service discovery gateway being located on the first VLAN and the client device being located on the second VLAN;
- based at least in part on receiving the first message, sending a second message to the client device comprising at least the first indication of at least one service provider corresponding to the service discovery query;
- in the directory local to the service discovery gateway, maintaining an updated indication of at least one service provider of services available on the first VLAN and on the second VLAN during a second time period different from the first time period;
- determining a condition is met based at least in part on a predictive awareness of the service discovery gateway as to how the client device is configured to utilize a time-to-live (TTL) value; and
- sending, with the service discovery gateway, a third message to the client device prior to the client device originating a subsequent service discovery query based at least in part on the condition being met, the third message comprising at least the updated indication corresponding to the service discovery query, the updated indication including an identification of a service provider available of the at least one service provider providing a service corresponding to the service discovery query.

15. The service discovery gateway of claim 14, wherein the second message is a unicast message to the client device.

16. The service discovery gateway of claim 14, wherein:
the determining is based at least in part on the elapsed time associated with the second message relative to the TTL value.

17. The service discovery gateway of claim 16, wherein:
the determining is based at least in part on the elapsed time associated with the second message relative to a configurable service query time parameter.

18. The service discovery gateway of claim 14, wherein:
the service discovery query is a multicast domain name system (mDNS) query.

19. The service discovery gateway of claim 18, wherein:
the second message and the third message are mDNS response messages.

20. The service discovery gateway of claim 14, wherein:
the first message is a multicast message.

* * * * *